(12) United States Patent
Saxena et al.

(10) Patent No.: US 10,397,055 B2
(45) Date of Patent: Aug. 27, 2019

(54) PRIORITY BASED SCHEDULING IN NETWORK CONTROLLER USING GRAPH THEORETIC METHOD

(71) Applicant: Nicira, Inc., Palo Alto, CA (US)

(72) Inventors: Aayush Saxena, San Jose, CA (US); Aravinda Kidambi Srinivasan, Mountain View, CA (US)

(73) Assignee: Nicira, Inc., Palo Alto, CA (US)

( * ) Notice: Subject to any disclaimer, the term of this patent is extended or adjusted under 35 U.S.C. 154(b) by 64 days.

(21) Appl. No.: 15/841,063

(22) Filed: Dec. 13, 2017

(65) Prior Publication Data

US 2019/0182107 A1 Jun. 13, 2019

(51) Int. Cl.
| | |
|---|---|
| *G06F 15/16* | (2006.01) |
| *H04L 12/24* | (2006.01) |
| *G06F 9/455* | (2018.01) |
| *H04L 12/26* | (2006.01) |
| *H04L 12/715* | (2013.01) |
| *H04L 29/08* | (2006.01) |

(52) U.S. Cl.
CPC ........ *H04L 41/082* (2013.01); *G06F 9/45558* (2013.01); *H04L 41/0823* (2013.01); *H04L 41/0893* (2013.01); *H04L 41/12* (2013.01); *H04L 29/08072* (2013.01); *H04L 41/0816* (2013.01); *H04L 43/04* (2013.01); *H04L 45/64* (2013.01)

(58) Field of Classification Search
CPC ............. H04L 29/08072; H04L 29/06; H04L 41/0816; H04L 41/12
See application file for complete search history.

(56) References Cited

U.S. PATENT DOCUMENTS

| | | | | |
|---|---|---|---|---|
| 7,308,198 B1 * | 12/2007 | Chudak | .................. | H04L 45/02 398/58 |
| 8,111,619 B2 * | 2/2012 | Liu | ........................ | H04L 45/24 370/229 |
| 9,198,203 B2 * | 11/2015 | Shaffer | .................... | H04L 45/24 |
| 10,243,836 B2 * | 3/2019 | Sackman | ............... | H04L 45/125 |
| 2007/0008884 A1 * | 1/2007 | Tang | ....................... | H04L 29/06 370/230 |
| 2010/0061269 A1 * | 3/2010 | Banerjee | ............. | H04L 12/4675 370/254 |
| 2011/0173189 A1 * | 7/2011 | Singh | .................. | G06F 16/9024 707/722 |
| 2014/0280802 A1 * | 9/2014 | McDowall | .......... | H04L 41/0816 709/221 |
| 2017/0239694 A1 * | 8/2017 | Ludwig | .................. | C09D 9/005 |

* cited by examiner

*Primary Examiner* — Khanh Q Dinh

(74) *Attorney, Agent, or Firm* — Patterson + Sheridan, LLP

(57) ABSTRACT

Certain embodiments described herein are generally directed to determining efficient update schedules for logical networks based on a graph representing the priority of features supported by the network, and a graph representing the priority of logical entities within the logical network. By building a graph of the logical network using directed edges to represent the update priority of one logical entity over another, an ordering, or a set of possible orderings, may be obtained. A topological sort of the graph may obtain such an ordering. Alternative orderings may indicate opportunities for parallel updating, which may result in a more efficient process for updating the logical network.

20 Claims, 7 Drawing Sheets

PRIORITY BASED SCHEDULING IN NETWORK CONTROLLER USING GRAPH THEORETIC METHOD

BACKGROUND

Software-defined networking (SDN) often uses network controllers to configure logical networks throughout a datacenter. As SDN becomes more prevalent and datacenters cater to more and more tenants, controllers are expected to perform more operations. For example, a datacenter may include a plurality of physical host machines hosting a plurality of virtual machines (VMs) (or other virtual computing instances, such as containers (e.g., Docker containers), data compute nodes, isolated user space instances, namespace containers, etc.). The VMs may be interconnected as part of a logical network configured by a network controller.

In order to implement and manage a logical network on the plurality of host machines, the network controller may implement logical entities (e.g., logical routers, logical switches, etc.) as software running on the plurality of host machines. Such software may include virtual entities (e.g., virtual routers, virtual switches, virtual extensible local area network (VXLAN) tunnel endpoints (VTEPs), etc.) that run on the plurality of host machines to implement the functionality defined by the logical network. For example, the logical network may define two VMs as connected to logical ports of a single logical switch. The VMs, however, may be running on separate host machines. Accordingly, the network controller may configure the host machines with virtual entities that forward packets between the separate host machines over a physical network such that the two VMs can communicate as though they were connected to the same switch. A particular logical entity may be implemented by only a subset of the virtual entities managed by the controller.

At times, the configuration of the logical network may be updated, such as by an administrator of the logical network. For example, a logical entity may be added/removed from the logical network, interconnections between logical entities may be changed, configuration of a logical entity may be updated, etc. Different logical entities may be associated with/include different types of features (e.g., IP address discovery, span updater, L2 features, L3 features, logical grouping, distributed firewall, distributed network encryption, etc.). For example, a logical router is associated with L3 features; a logical switch is associated with L2 features, etc. Accordingly, the network controller, based on the update to the logical network, may need to update one or more logical entities associated with certain features, meaning the network controller may need to update one or more virtual entities that implement the one or more logical entities on the physical host machines. However, current techniques for updating the one or more logical entities could be improved.

SUMMARY

Herein described are one or more embodiments of a method for updating a logical network based on a logical network priority graph. The method includes defining a plurality of nodes of the logical network priority graph, the plurality of nodes corresponding to a plurality of logical entities of the logical network. The method further includes defining a set of directed edges between the plurality of nodes. A first edge of the set of directed edges is formed between a first node comprising a source node of the first edge and a second node comprising a destination node of the first edge. The first edge indicates that a first logical entity corresponding to the first node is associated with a first logical network feature of higher priority than a second logical network feature associated with a second logical entity corresponding to the second node and that the second logical entity includes configuration information of the first logical entity. The method further includes determining an update to the logical network. The method further includes determining a set of logical entities of the plurality of logical entities to update based on the update to the logical network. The method further includes topologically sorting the logical network priority graph to produce an update ordering for the set of logical entities. The method further includes determining a set of host machines comprising a set of virtual entities corresponding to the set of logical entities. Finally, the method includes sending an update for each virtual entity of the set of virtual entities to a corresponding host machine of the set of host machines according to the update ordering.

Also described herein are embodiments of a computer system, wherein software for the computer system is programmed to execute the method described above for updating a logical network based on a logical network priority graph.

Also described herein are embodiments of a non-transitory computer readable medium comprising instructions to be executed in a computer system, wherein the instructions when executed in the computer system perform the method described above for updating a logical network based on a logical network priority graph.

DETAILED DESCRIPTION

Embodiments presented herein relate to systems and methods for generating a logical network priority graph for a logical network and updating virtual entities that implement logical entities of the logical network in host machines based on the logical network priority graph. In this specification, the terms "logical network entity," "logical network element," and the like will refer to software defined networking (SDN) logical overlay network features. The terms, "virtual entities" and the like will refer to software-implemented networking services that reside in a distributed manner on a plurality of physical host computers and may handle logical overlay or physical underlay network traffic. In so doing, virtual entities, which include software-implemented switches, routers, tunnel endpoints, network filters/firewalls, etc., implement policies for the overlay software-defined network.

Figure 1:
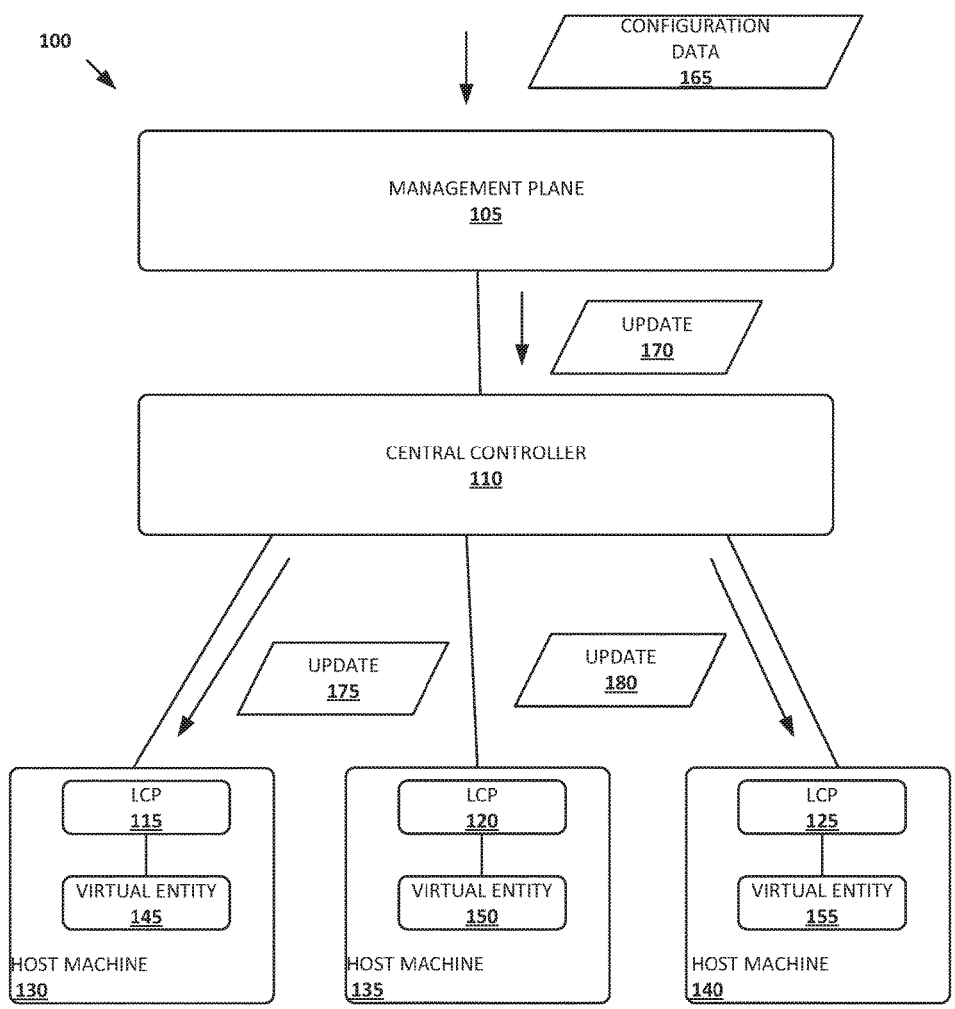
FIG. 1 is a block diagram of a network control system for a virtual network.

FIG. 1 is a block diagram of a network control system 100 including a central controller 110 (i.e., a network controller) that implements embodiments described herein. As shown, network control system 100 includes a management plane 105, a central controller 110, and multiple local controllers (also called the local control plane (LCP)) 115-125 that operate on host machines 130-140. In addition, each of host machines 130-140 includes a virtual entity 145-155 that processes data traffic according to configuration information received from its respective controller 115-125.

Though shown as single units, it should be understood that both management plane 105 and central controller 110 may be implemented as distributed or clustered systems. That is, management plane 105 may include multiple computing devices that implement management plane functions, and a central controller 110 may include multiple central controller computers, virtual machines or other virtual computing instances that implement central control plane functions. In some embodiments, each central controller computer implements both management plane and central control plane functions (e.g., as separate applications or functions).

In some embodiments, management plane 105 is responsible for receiving logical network configuration data 165 (e.g., through an application programming interface). Users (e.g., network administrators) may enter configuration data through, e.g., a command-line interface, a graphical user interface, etc. Configuration data is associated with a logical network. The logical network may include logical networking elements, which may be implemented as virtual entities on host machines 130-140, such as a logical switch implemented as a virtual switch, a logical router implemented as a virtual router, etc. Configuration data may include information describing logical entities, such as logical ports (e.g., assigning media access control (MAC) and/or Internet protocol (IP) addresses to the logical ports) for logical networking elements, how logical networking elements are interconnected, various service rules (such as distributed firewall rules) to be enforced at one or more logical networking elements, etc. Each of these pieces of configuration data, including logical networking elements, service rules, rule sets, etc., may be referred to as a logical entity.

Management plane 105 receives logical network configuration data 165 and generates desired state data that specifies how the logical network should be implemented in the physical infrastructure. In some embodiments, this data includes a description of the logical networking elements and logical ports in a uniform format (e.g., as a set of database records or another format). When users provide configuration changes (e.g., creating or deleting logical entities, modifying properties of logical entities, changing relationships between logical entities, etc.), the changes to the desired state are distributed as logical network updates 170 to central controller 110.

Central controller 110 receives updates 170 from management plane 105, and is responsible for distributing the updates to the virtual entities 145-155 that it manages (e.g., via local controllers 115-125). In some embodiments, central controller 110 is part of a central control plane cluster, with each controller in the cluster managing a different set of virtual entities. Central controller 110 receives update 170 to the desired state and, determines the virtual entities in the virtual network that need to be updated based on update 170. Central controller 110 then generates state updates (e.g., updates 175 and 180) based on update 170 for the local controllers of the corresponding virtual entities to be updated, and sends the updates to the corresponding local controllers. For example, central controller 110 may determine that virtual entities 145 and 155 need to be updated and sends updates 175 and 180 to local controllers 115 and 125, respectively.

In some embodiments, local controllers 115-125 are responsible for translating the received updates into configuration data formatted for their respective virtual entities 145-155. In some embodiments, the local controller is a daemon that operates in the virtualization software of the host machine, as does the virtual entity. In other embodiments, the local controller and virtual entity may operate within a VM that hosts multiple containers for one or more logical networks. In some such embodiments, a first local controller and virtual entity operate in the virtualization software on the host machine while a second local controller and virtual entity operate in the container host VM (or multiple such controllers/virtual entities operate in multiple container host VMs).

In addition, while in some embodiments all virtual entities in the physical infrastructure are of the same type (and thus require data in the same format), in other embodiments the physical infrastructure may include multiple different types of virtual entities. For instance, some embodiments include both hosts with kernel virtual machine (KVM) virtualization software with flow-based virtual entities (e.g., Open vSwitch) and hosts with ESX virtualization software with feature-based virtual entities. Such different types of virtual entities require different data formats from the local controller. As such, in some embodiments, local controllers 115-125 are configured to translate the received updates into the specific format required by their virtual entities.

Figure 2:
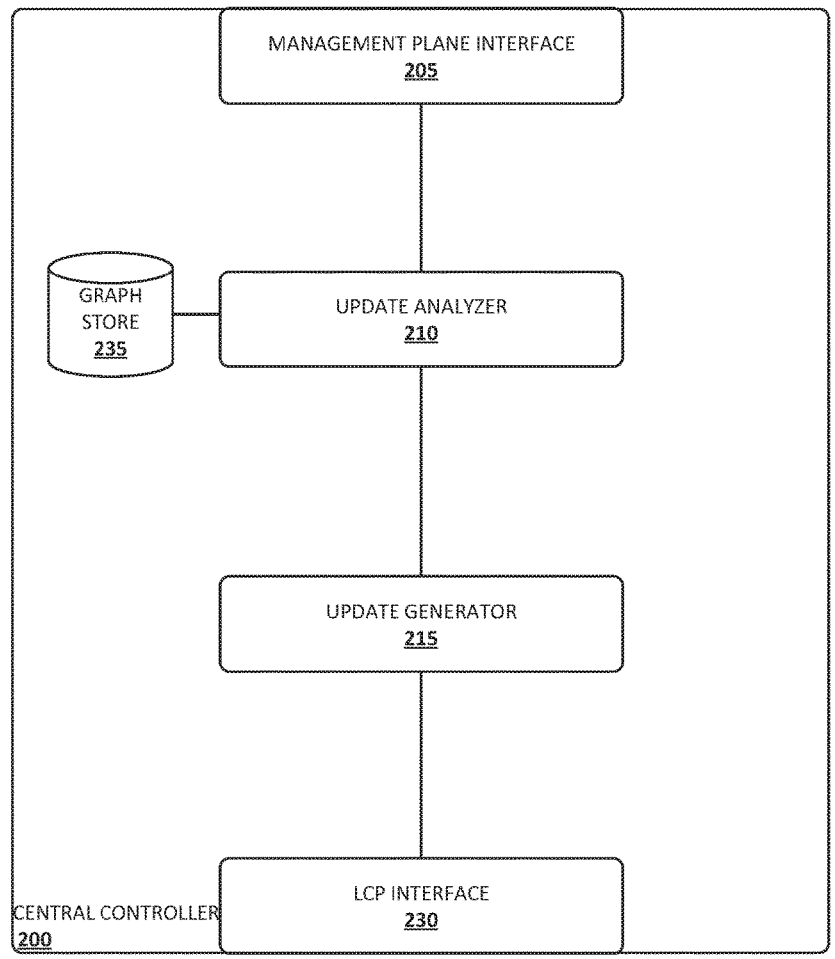
FIG. 2 is a block diagram of a central network controller of FIG. 1.

FIG. 2 conceptually illustrates the architecture of a central controller 200 of some embodiments, such as central controller 110 of FIG. 1. Central controller 200 includes a management plane interface 205, an update analyzer 210, an update generator 215, and a local control plane interface 230.

Figure 3:
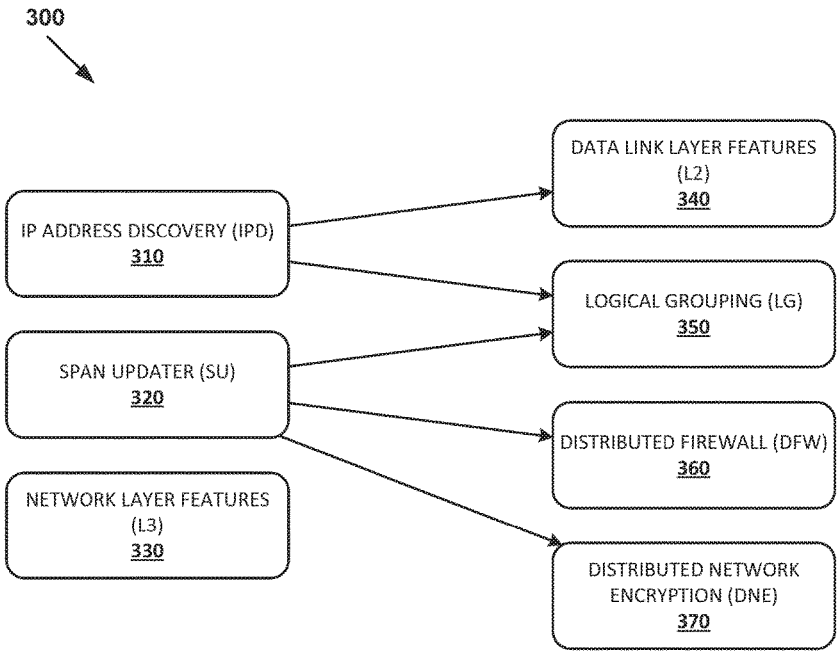
FIGS. 3 and 3A illustrate an example of a feature priority graph for a logical network and example operations for generating feature priority graphs.
Figure 4:
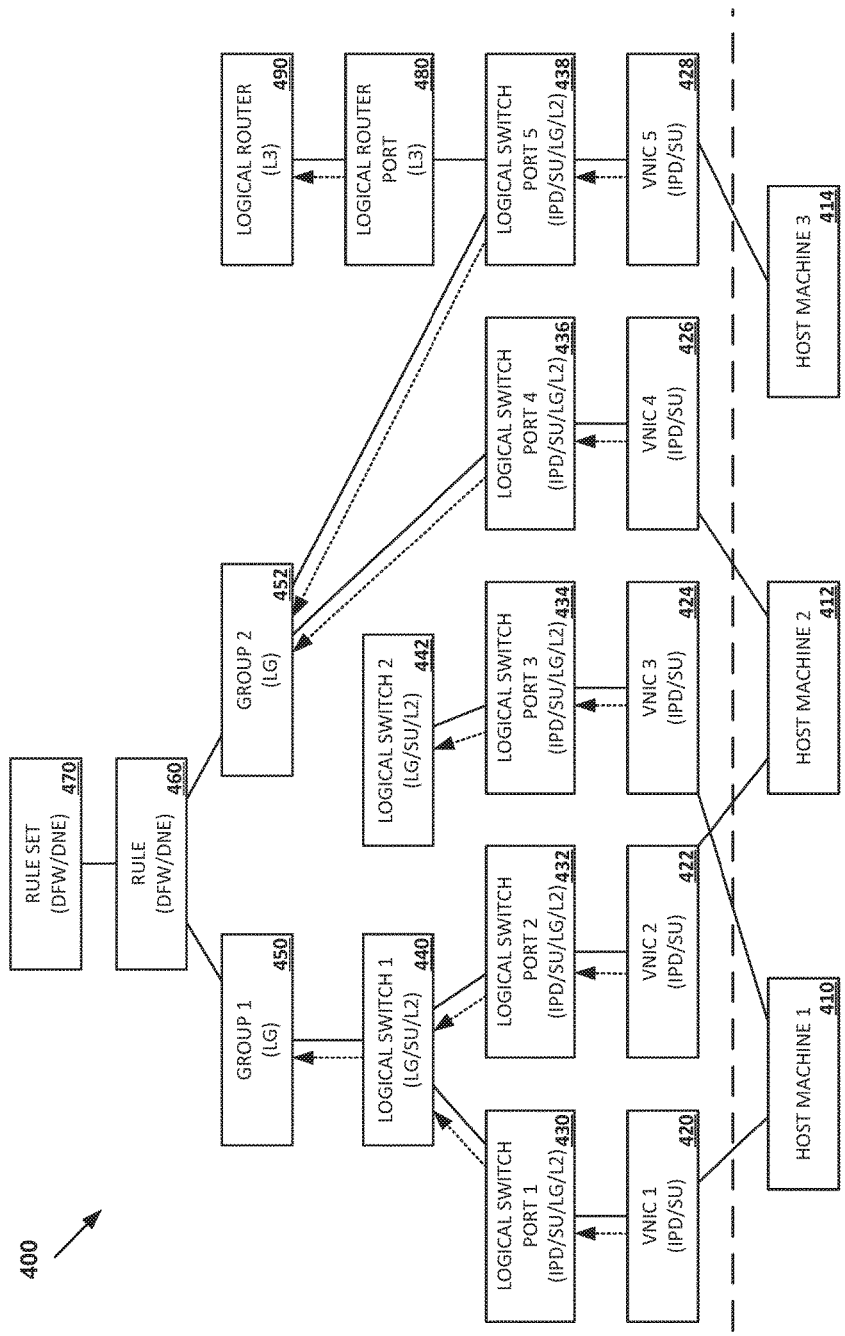
FIG. 4 illustrates an example of a logical network priority graph.

In addition, the central controller 200 stores in a graph store 235 (e.g., in volatile memory, such as RAM, a non-volatile memory, etc.) one or more directed graphs of the current state of one or more logical networks, which may include a feature priority graph and a logical network priority graph, examples of which are shown in FIGS. 3 and 4, respectively.

Management plane interface 205 handles interactions with the management plane. Central controller 200 receives changes in the desired state of one or more logical networks through this management plane interface 205.

Update analyzer 210 receives updates to the desired state and determines whether to generate a new logical network priority graph or modify a logical network priority graph in graph store 235. For example, if the received update is for a configuration for an entire new logical network that does not have a logical network priority graph stored at central controller 200, update analyzer 210 generates a logical network priority graph for the logical network based on the desired state information. Update analyzer 210 may then determine all the logical entities identified in the desired state information need to be updated. Accordingly, update analyzer 210 determines all virtual entities on one or more host machines that implement the logical entities need to be updated.

If the received update is for a configuration update of an existing logical network that does have a logical network priority graph stored at central controller 200, update analyzer 210 determines the logical entities that need to be updated based on the received update and if the logical network priority graph needs to be updated. Based on the determined logical entities, the update analyzer determines which virtual entities on one or more host machines that implement the logical entities need to be updated. For example, if the update includes an update to a relationship between logical entities, then the logical network priority graph may need to be updated, otherwise the logical network priority graph may not need to be updated. If needed, update analyzer 210 updates the logical network priority graph.

Update analyzer 210 informs update generator 215 of which virtual entities need to be updated. Update generator 215 is responsible for distributing updates through local control plane interface 230 to the appropriate local controllers of the determined virtual entities. In some embodiments, central controller 200 has a separate channel with each of the local controllers that it manages via local control plane interface 230.

FIG. 3 is an illustration of an example feature priority graph 300. Feature priority graph 300 represents network features supported by an example logical network. In one embodiment, feature priority graph 300 is a directed, acyclic graph. Feature priority graph 300 may be created by input from a user, such as a network administrator, when the user specifies the features supported by the network. Each node of the graph represents a network feature. The features represented by example feature priority graph 300 are not intended to be exhaustive of the potential features that a network may support. Node 310 represents the feature IP address discovery (IPD). Node 320 represents the feature span updater (SU). Node 330 represents network layer features (L3). Node 340 represents data link layer features (L2). Node 350 represents the feature logical grouping (LG). Node 360 represents distributed firewall (DFW) features. Node 370 represents distributed network encryption (DNE) features. An edge indicates that a feature represented by a source node has scheduling priority over a feature represented by a destination node. A feature having scheduling priority means that the higher priority feature must be updated before the lower priority feature, often because the lower priority feature relies on output from the higher priority feature. In certain embodiments, the edge indicates that configuration of a feature represented by the destination node depends on the source node configuration.

For example, node 310 is the source node of an edge with destination node 340. Node 310 represents IPD and node 340 represents L2, meaning the edge between them indicates that IPD is a higher priority feature than L2 (e.g., that the configuration of L2 depends on the configuration of IPD). The edge between node 310 and node 340 allows a controller of the logical network, such as central controller 110, to determine that IPD updates need to process before L2 updates. In particular, in certain embodiments, the IPD feature may be used to discover IP addresses of a virtual or logical entity in a network, such as a logical switch port. An example of an L2 feature may refer to a feature for generating configuration of spoof guard for logical entities (e.g., for logical switch ports). An example of a LG feature may refer to a feature for aggregation of IP addresses of logical entities (e.g., logical switch ports aggregated for a logical switch) to translate the user-configured firewall rules referring to logical entities into one that can be understood by the datapath implementations. In one example, aggregating IP addresses into logical switch ports and configuring spoof guard at a logical switch port both require use of the IP address of the logical switch port. Accordingly, the L2 and LG feature depends on the output of the IPD feature for configuration.

Cycles are not allowed in feature priority graph 300 as a cycle would indicate a priority loop among features. Feature priority graph 300 defines a partial order for all features supported by a network. Any node reachable from a particular node will represent a lower priority feature than the particular node. A node in feature priority graph 300 with no incoming edges indicates that the feature represented by that node is of the highest priority, i.e., that feature does not rely on any other features. A node with no edges in or out, such as node 330 representing Network Layer (L3) features, indicates that node represents a feature which does not depend on any other features nor has any dependent features.

Figure 3A:
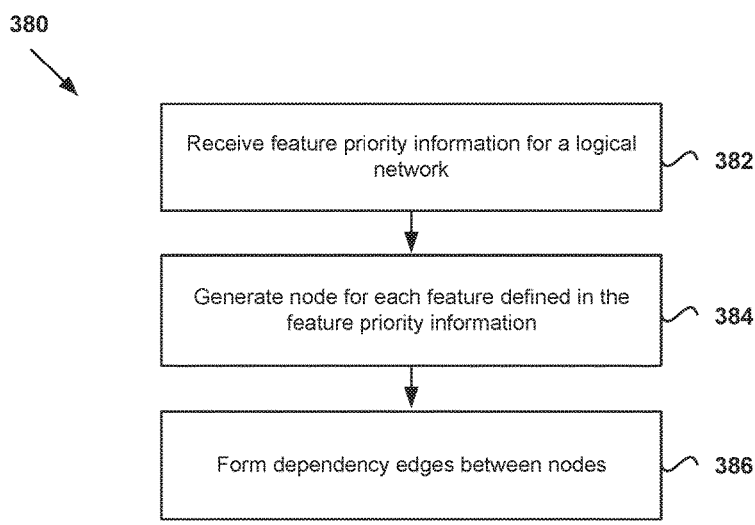

FIG. 3A conceptually illustrates example operations 380 for generating a feature priority graph for a logical network.

As shown, at 382, update analyzer 210 receives feature priority information for a logical network from management plane 105. At 384, update analyzer 210 generates a node for each feature defined in the priority information. Further, at 386, update analyzer 210 forms dependency edges for all pairs of nodes where the feature represented by the source node is of higher priority than the feature represented by the destination node.

FIG. 4 is an illustration of an example of a logical network priority graph 400. Logical network priority graph 400 represents both the configuration of a logical network and the priority of features supported by that logical network. Nodes 410-414 represent host machines 1-3 on which the logical network is implemented. Each of the remaining nodes 420-490 of the graph represents a particular virtual or logical entity in the network or networks that are being managed by the manager and controller (e.g., management plane 105 and central controller 110 of FIG. 1). The dashed line, therefore, separates logical entities from the host machines on which the logical entities are implemented.

Logical network priority graph 400 includes connection edges, illustrated as a solid line between nodes. A connection edge indicates that the logical entities represented by the nodes are directly related in the logical network (e.g, a connection edge is formed between a first logical entity and a second logical entity, when the first logical entity contains configuration information of the second logical entity). For example, the connection edge between node 420 representing virtual network interface controller (VNIC) 1 and node 430 representing logical switch port (LSP) 1 indicates that VNIC 1 is directly related to LSP 1, in that VNIC 1 is connected to LSP 1 in the logical network.

VNIC 2 is represented as connected to LSP 2, by the connection edge between nodes 422 and 432. Both LSP 1 and LSP 2 are represented as part of logical switch 1 by the connection edges between nodes 430 and 440 and between nodes 432 and 440. In particular, both LSP 1 and LSP 2 are LSPs of logical switch 1 and therefore related to logical switch 1.

VNIC 3 is represented as connected to LSP 3, by the connection edge between nodes 424 and 434. LSP 3 is represented as part of logical switch 2 by the connection edge between nodes 434 and 442.

VNIC 4 is represented as connected to LSP 4 by the connection edge between nodes 426 and 436. VNIC 5 is represented as connected to LSP 5 by the connection edge between nodes 428 and 438. LSP 5 is represented as part of logical router port by the connection edge between nodes 438 and 480, and logical router port is represented as part of logical router by the connection edge between nodes 480 and 490.

The connection edge between nodes 440 and 450 indicates that logical switch 1 is part of a group 1 corresponding to a grouping of logical entities. The connection edges between nodes 436 and 452, and between nodes 438 and 452 indicate that LSP 4 and LSP 5 are part of a group 2. The connection edges between nodes 450 and 460, and between nodes 452 and 460 indicate that group 1 and group 2 are subject to the rule represented by node 460. The connection edge between nodes 460 and 470 indicates that the rule represented by node 460 is a part of the rule set represented by node 470.

In some embodiments, central controller 200 may receive a graph with the logical entities in logical network priority graph 400 and with the connection edges illustrated in FIG. 4 from management plane 105. For example, the management plane 105 may send a graph to the central controller 200 showing a desired state of the logical network. In some embodiments, central controller 200 may derive the graph with the logical entities in logical network priority graph 400 and with the connection edges illustrated in FIG. 4 based on information indicating desired state of the logical network received from management plane 105.

Each node in logical network priority graph 400 also represents example features which may be associated with the logical entity represented by the node. These features may correspond to the features represented in feature priority graph 300. For example, VNIC 1 is associated with the features IPD and SU, while LSP 1 is associated with the features IPD, SU, logical grouping (LG) and L2.

Based on the features associated with the logical entities represented by the nodes, and the feature priority graph 300, the central controller 200 may further define superior-to edges, illustrated by a dotted line between nodes, in the logical network priority graph 400. Central controller 200 may form a superior-to edge between nodes connected by a connection edge when the source node of the connection edge is associated with a feature that has a higher scheduling priority than a feature associated with the destination node. In certain aspects, a superior-to edge is formed if any of a plurality of features associated with the source node has a higher scheduling priority than any of a plurality of features associated with the destination node. A first feature having a higher scheduling priority than a second feature generally means that the first feature must be updated first. This may be because the second feature requires output from the first feature to properly function. For example, node 430 has a connection edge with node 440. Node 430 representing LSP 1 is associated with feature IPD. Node 440 representing logical switch 1 is associated with feature L2. As discussed, feature L2 has a lower scheduling priority than feature IPD based on feature priority graph 300, meaning feature L2 may use output produced by feature IPD. Accordingly, central controller 200 forms a superior-to edge from node 430 to node 440. A superior-to edge indicates that the logical entity represented by the source node needs to be updated before the logical entity represented by the destination node may be updated.

A connection edge generally indicates that one node of the connection edge contains configuration information of the other node. For example, since node 440 has a connection edge with node 430, logical switch 1 represented by node 440 may contain configuration information of LSP 1 represented by node 430, meaning the configuration of node 440 depends on the configuration of node 430. Further, since node 440 has a superior-to edge with node 430, features of logical switch 1 represented by node 440 may be based on features of LSP 1 represented by node 430. Accordingly, LSP1 may need to be updated before logical switch 1 is updated.

In certain cases, central controller 200 may form a superior-to edge between nodes that are associated with the same feature. For example, a superior-to edge is formed between node 480 representing logical router port and node 490 representing logical router. This may be because the L3 feature associated with node 480 and node 430 depends from itself, meaning that configuration of the L3 feature at logical router port affects the configuration of the L3 feature at logical router. Accordingly, whether a superior-to edge is formed between nodes that are associated with the same feature depends on the feature. For example, no superior-to edge is formed between nodes 460 and 470, though they include the same feature.

Although as illustrated superior-to edges flow from the bottom of the graph to the top, this is not always true. For example, node 438 representing LSP 5 is not superior to node 480 representing a logical router port, even though LSP 5 is connected to the logical router port by a connection edge. This is because the logical router port is only associated with L3 features, which is a feature with no dependency edges in feature priority graph 300. Further, node 460 representing a rule does not depend on lower nodes for output and so there are no inbound superior-to edges to node 460.

Figure 5:
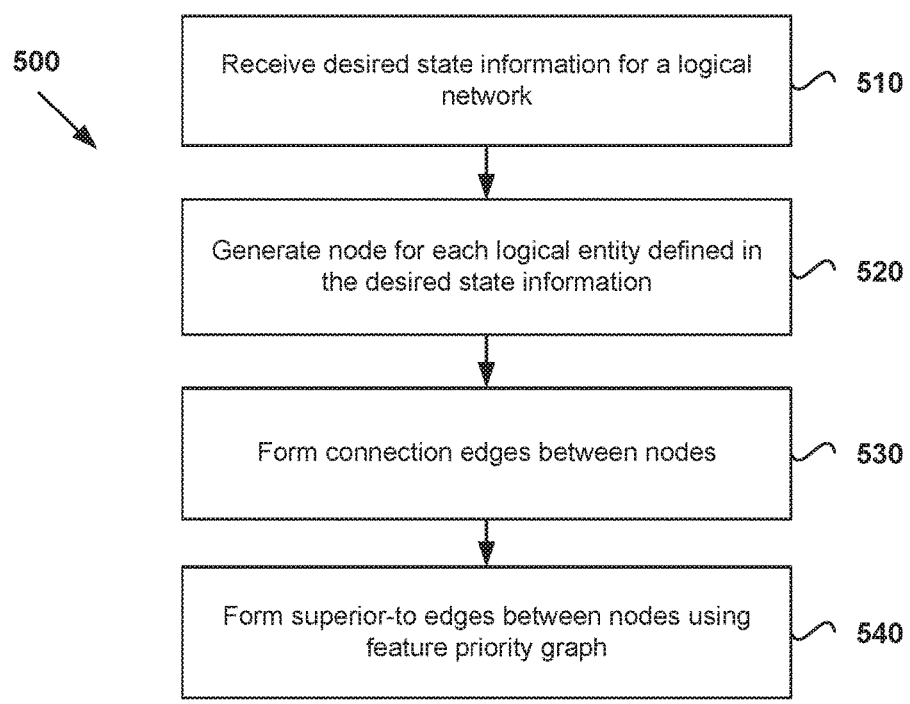
FIG. 5 illustrates example operations for generating logical network priority graphs.

FIG. 5 conceptually illustrates example operations 500 for generating a logical network priority graph using information from a feature priority graph, such as a feature graph generated by the operations of FIG. 3A.

As shown, at 510, update analyzer 210 receives desired state information for a logical network from management plane 105. At 520, update analyzer 210 generates a graph having a node for each logical entity defined in the desired state information, the node defining the desired state for the corresponding logical or virtual network element. Further, at 530, update analyzer 210 forms connection edges for all pairs of nodes representing logical entities directly related in the logical network. At 540, update analyzer 210 forms superior-to edges between nodes using the feature priority graph.

Figure 6:
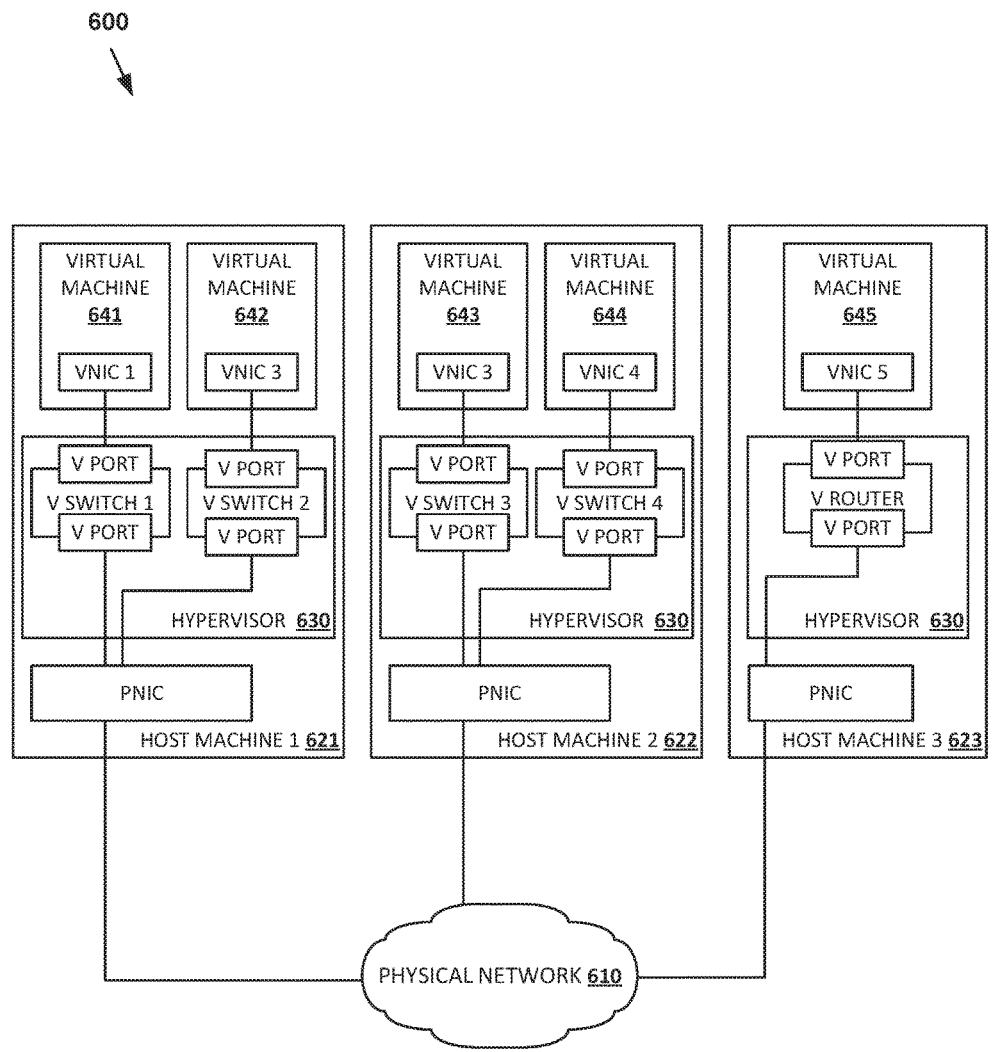
FIG. 6 illustrates an exemplary implementation of a logical network.

FIG. 6 is an illustration of computing system 600 implementing the logical network of logical network priority graph 400. Computing system 600 includes host machines 621-623 in communication via a physical network 610. Each host machine includes a physical network interface controller (PNIC), a hypervisor 630, and at least one of VMs 641-645.

Each host machine 621-623 may provide part of the computing infrastructure in a virtualized computing environment distributed among multiple host machines. Though certain embodiments are described herein with respect to VMs, the same principals and techniques may also apply to other appropriate virtual computing instances (e.g., virtual machine, container, data compute node, isolated user space instance). In certain embodiments, each host machine 621-623 is a physical general purpose computer (e.g., a server, workstation, etc.) and includes one or more physical central processing units (CPUs), a system memory, and non-volatile data storage, (not shown) in addition to one or more PNICs.

Hypervisor 630 on each host machine 621-623 serves as an interface between the at least one of VMs 641-645 running on the host machine and the PNIC of the host machine, as well as other physical resources available on the host machine. Each VM 641-645 is shown including a VNIC, which is responsible for exchanging packets between the VM and the respective hypervisor 630. Though shown as included in VMs 641-645, it should be understood that VNICs may be implemented by code (e.g., VM monitor code) associated with the respective hypervisor 630. VNICs may be, in some cases, a software implementation of a physical network interface controller. Each VM 641-644 is connected to a virtual port (vport) provided by a respective virtual switch (vswitch) through the VM's associated VNIC. A virtual switch may serve as a physical network switch, i.e., serve as an edge device on the physical network, but implemented in software. The virtual switch is connected to a PNIC to allow network traffic to be exchanged between VMs executing on a given host machine and destinations on an external physical network 610.

While hypervisor 630 on each host machine 621-622 is illustrated as including a virtual switch, it should be recognized that hypervisor 630 on each host machine 621-622 may additionally expose virtual ports to one or more of VMs 641-644 using a virtual router or other virtual networking infrastructure provided by hypervisor 630. For example, hypervisor 630 on host machine 623 includes a virtual router, and VM 645 is connected to a virtual port of the virtual router via the VNIC of VM 645.

Hypervisor 630, in some embodiments, may run in conjunction with a conventional operating system in respective host machine 621-623. In some other embodiments, hypervisor 630 can be installed directly on respective host machine 621-623 and insert a virtualization layer between the hardware and each one of guest operating systems of the VMs 641-645. In yet some other embodiments (also not shown) hypervisor 630 includes system level software component and a privileged virtual machine that may contain physical device drivers (not shown), virtual switches, or other hypervisor components.

As shown, based on logical network priority graph 400, VNIC 1 and VNIC 3 are implemented on host machine 621 corresponding to host machine 1 in logical network priority graph 400. Further, VNIC 2 and VNIC 4 are implemented on host machine 622 corresponding to host machine 2 in logical network priority graph 400. VNIC 5 is implemented on host machine 623 corresponding to host machine 3 in logical network priority graph 400.

Logical switch 1 from logical network priority graph 400 is shown implemented as virtual switches 1 and 3 on host machines 621 and 622. Logical switch 1 includes LSP 1 connected to VNIC 1, which is implemented on host machine 621, and also includes LSP 2 connected to VNIC 2, which is implemented on host machine 622. Accordingly, logical switch 1 may be implemented as multiple virtual entities (virtual switches 1 and 3) on host machines 621 and 622. Virtual switch 1 and 3 may be configured as on the same virtual local area network (VLAN), ports of the virtual switches 1 and 3 may be defined as part of the same port group, etc., such that virtual switches 1 and 3 can act as though they are the same switch (corresponding to logical switch 1). For example, central controller 200 may address virtual switch 1 (connected to VNIC 1) and virtual switch 3 (connected to VNIC 3) as if they were the same virtual switch. That is, both VNIC 1 and VNIC 3 will communicate with each other as if they were on the same L2 network, despite the fact that communications between them in fact travel over physical network 610 to different host machines. Similarly, logical switch 2 from logical network priority graph 400 is shown implemented as virtual switch 2 on host machine 621, and logical router is shown implemented as the virtual router on host machine 623. Virtual switch 1 includes a virtual port implementing LSP1. Virtual switch 2 includes a virtual port implementing LSP3. Virtual switch 3 includes a virtual port implementing LSP2. Virtual switch 4, implemented on host machine 622, includes a virtual port implementing LSP4. The virtual router includes a virtual port implementing LSP5.

Figure 7:
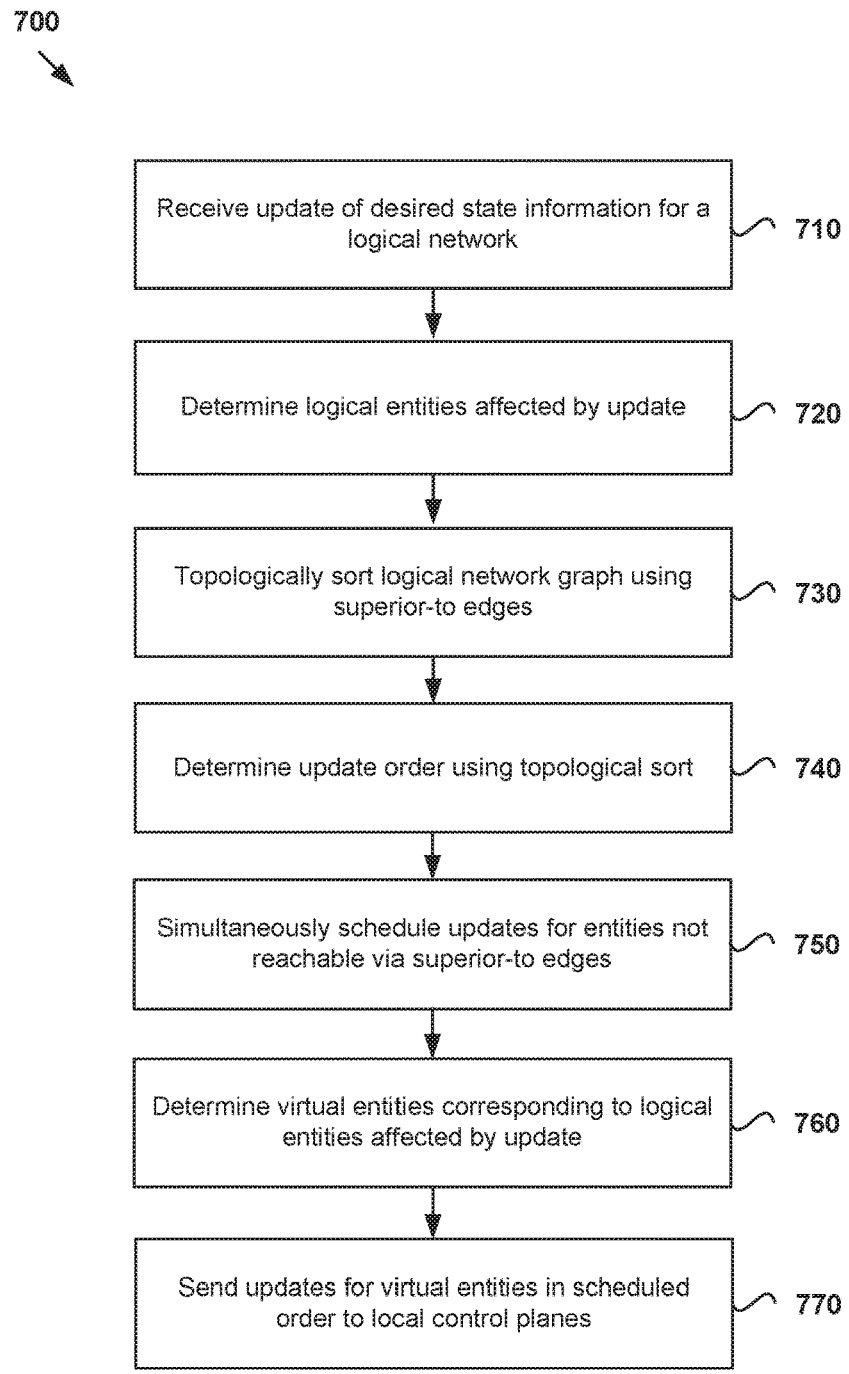
FIG. 7 illustrates example operations for updating a virtual network using a logical network priority graph.

FIG. 7 conceptually illustrates example operations 700 for determining an efficient update schedule for logical entities in a logical network, and correspondingly the virtual entities that implement the logical entities on host machines. As shown, at 710, update analyzer 210 receives an update of desired state information for a logical network from management plane 105. The update indicates a change to the logical network (e.g., creating or deleting logical entities, modifying properties of logical entities, changing relationships between logical entities, etc.). At 720, update analyzer 210 determines which logical entities are affected by the update. For example, in the example shown in FIG. 4, if a configuration of logical switch 1 is updated, logical switch 1, and any logical entities that depend on the configuration of logical switch 1, such as group 1, may be determined to be affected by the update. Multiple logical entities may be affected by the update.

At 730, update analyzer 210 topologically sorts a logical network priority graph of the logical network (e.g., as updated by update analyzer 210 based on the update) based on superior-to edges. A topological sort is a process which may be performed on an acyclic directed graph to create an ordering of that graph. When sorting the graph, each source node of a directed edge must precede the destination node of that directed edge. In the example of the logical network priority graph of FIG. 4, an ordering must always feature node 430 preceding node 440, because the superior-to edge between node 430 and node 440 is a directed edge. There are many possible topological sorting algorithms. In general, a topological sorting algorithm may traverse the nodes of a graph by traveling along directed edges of the graph, and storing a marker for every visited node. By sequencing through the graph with different start nodes or making different choices of which node to travel where there are multiple outbound edges, all potential paths, or orderings, through the graph may be obtained.

In some embodiments, the logical network priority graph is directed and acyclic, so such a graph defines a partial order of priority for the logical network, which can be used to generate an ordering by a topological sorting algorithm. By topologically sorting the graph, the resulting ordering(s) will show the nodes in the potential ways the logical entities could be updated sequentially.

At 740, update analyzer 210 determines an update order using the topologically sorted graph. For example, a topological sort of nodes 430, 434 and 440 of logical network priority graph 400 would show 430-434-440, 430-440-434 and 434-430-440 as potential update orders because nodes 430 and 434 are of equal priority and can be updated in any order with respect to each other, but node 430 is superior to node 440 so node 430 must be updated before node 440.

At 750, update analyzer 210 simultaneously schedules updates for logical entities represented by nodes not reachable via superior-to edges. Following from the previous example, because nodes 430 and 434 can be updated in any order with respect to each other, they may instead be updated in parallel. When looking at the logical network priority graph as a whole, as shown in FIG. 4, nodes 420, 422, 424, 426, 428, 460, 470, and 480 are all not reachable via any superior-to edges. As a result, the logical entities represented by nodes 420, 422, 424, 426, 428, 460, 470 and 480 may all be updated in parallel. Further, at each level represented in the logical network priority graph, non-dependent nodes may be updated in parallel. For example, when updating LSPs, nodes 430, 432, 434, 436, and 438 are all not reachable from one another via superior-to edges, so those nodes may be scheduled for updates in parallel as well. Such updating of nodes in parallel may provide increased processing efficiency as compared to serial processing of updates to features of logical entities. Even if an efficient update schedule may be determined, a sequential update order may still optionally be used.

In some embodiments, the logical network priority graph may have cycles. If so, a topological sort will not be possible as topological sorts are only possible on acyclic graphs. In this circumstance each logical entity in a recognized cycle may be treated as the same priority and scheduled for update simultaneously. Then, the nodes comprising the cycle may be removed from the graph for the purpose of the topological sorting algorithm, which may then perform a typical topological sort on the remaining nodes.

At 760, update analyzer 210 determines which virtual entities correspond to the logical entities to be updated, and the host machines the virtual entities are implemented on. At 770, update analyzer 210 sends updates for the virtual entities corresponding to the logical entities in the scheduled order of update of the logical entities to the LCPs on the respective host machine(s). If virtual entities on multiple host machines corresponding to logical entities may be updated in parallel, the updates may be sent to the host machines' respective LCPs in parallel, as well.

The embodiments described herein may provide several advantages over other systems and methods for determining update orders for SDNs. For example, another method of determining update orders is for the controller to process all updates sequentially. That is, the controller would first push down updates for the highest priority feature. Then, once that updating is complete, the controller would push down updates for the next highest priority feature, and so on. This method is cumbersome and slow, and presents several efficiency problems. First, some networks may be configured such that certain parts of the network are disjoint, i.e., can be updated independently because no logical entities in the disjoint groups depend on each other. Failing to update these groups in parallel is an inefficient use of computing resources and time. Second, some features of the network may be unaffected by the priority chain required by the sequential method and can thus be updated at the same as any other. Updating these features sequentially is also inefficient. Third, even logical entities involved in the priority chain and not disjoint do not need to be updated sequentially when they do not depend on one another. This too is an inefficient update method. Finally, the sequential update method requires a total ordering of all features by priority. This makes the logical network more difficult to set up for a user, who must decide on the complete order for all features. By utilizing the systems and methods discussed herein, the logical network can be updated with more parallelism among individual updates and thus more efficiency than the old method.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for updating a logical network based on a logical network priority graph, the method comprising:
   defining a plurality of nodes of the logical network priority graph, the plurality of nodes corresponding to a plurality of logical entities of the logical network;
   defining a set of directed edges between the plurality of nodes, wherein a first edge of the set of directed edges is formed between a first node comprising a source node of the first edge and a second node comprising a destination node of the first edge, wherein the first edge indicates that a first logical entity corresponding to the first node is associated with a first logical network feature of higher priority than a second logical network feature associated with a second logical entity corresponding to the second node and that the second logical entity includes configuration information of the first logical entity;
   determining an update to the logical network;
   determining a set of logical entities of the plurality of logical entities to update based on the update to the logical network;
   topologically sorting the logical network priority graph to produce an update ordering for the set of logical entities;
   determining a set of host machines comprising a set of virtual entities corresponding to the set of logical entities; and
   sending an update for each virtual entity of the set of virtual entities to a corresponding host machine of the set of host machines according to the update ordering.

2. The method of claim 1, wherein the set of virtual entities comprise software running on the set of host machines that implement functionality of the set of logical entities as defined by the logical network.

3. The method of claim 1, wherein the first logical entity comprises a logical switch, wherein the first logical entity corresponds to a first virtual entity comprising a virtual switch.

4. The method of claim 1, further comprising;
   defining a plurality of feature nodes of a feature priority graph, the plurality of feature nodes corresponding to a plurality of logical network features supported by the logical network, the plurality of logical network features comprising the first logical network feature and the second logical network feature;
   defining a set of directed feature edges between the plurality of feature nodes, wherein a first feature edge of the set of directed feature edges is formed between a first feature node comprising a source node of the first feature edge and a second feature node comprising a destination node of the first feature edge, wherein the first feature edge indicates the first feature node represents the first logical network feature having higher priority than the second logical network feature represented by the second feature node.

5. The method of claim 4, further comprising defining the set of directed edges based on the feature priority graph.

6. The method of claim 1, wherein topologically sorting the logical network priority graph comprises;
   traversing, by a topological sorting algorithm, the logical network priority graph by moving along the set of directed edges from source nodes to destination nodes;
   storing, by the topological sorting algorithm, a marker of visited nodes in the logical network priority graph; and
   determining, by the topological sorting algorithm, a potential ordering of all nodes in the logical network priority graph.

7. The method of claim 1, further comprising;
   determining the logical network priority graph comprises a cycle of nodes, wherein a cycle of nodes comprises one or more nodes and one or more directed edges such that at least one node can be reached by a chain of directed edges starting at the at least one node;
   scheduling the one or more nodes to be updated simultaneously.

8. A computer system, wherein system software for the computer system is programmed to execute a method for updating a logical network based on a logical network priority graph, the method comprising:
   defining a plurality of nodes of the logical network priority graph, the plurality of nodes corresponding to a plurality of logical entities of the logical network;
   defining a set of directed edges between the plurality of nodes, wherein a first edge of the set of directed edges is formed between a first node comprising a source node of the first edge and a second node comprising a destination node of the first edge, wherein the first edge indicates that a first logical entity corresponding to the first node is associated with a first logical network feature of higher priority than a second logical network feature associated with a second logical entity corresponding to the second node and that the second logical entity includes configuration information of the first logical entity;
determining an update to the logical network;
determining a set of logical entities of the plurality of logical entities to update based on the update to the logical network;
topologically sorting the logical network priority graph to produce an update ordering for the set of logical entities;
determining a set of host machines comprising a set of virtual entities corresponding to the set of logical entities; and
sending an update for each virtual entity of the set of virtual entities to a corresponding host machine of the set of host machines according to the update ordering.

9. The computer system of claim 8, wherein the set of virtual entities comprise software running on the set of host machines that implement functionality of the set of logical entities as defined by the logical network.

10. The computer system of claim 8, wherein the first logical entity comprises a logical switch, wherein the first logical entity corresponds to a first virtual entity comprising a virtual switch.

11. The computer system of claim 8, wherein the method further comprises;
defining a plurality of feature nodes of a feature priority graph, the plurality of feature nodes corresponding to a plurality of logical network features supported by the logical network, the plurality of logical network features comprising the first logical network feature and the second logical network feature;
defining a set of directed feature edges between the plurality of feature nodes, wherein a first feature edge of the set of directed feature edges is formed between a first feature node comprising a source node of the first feature edge and a second feature node comprising a destination node of the first feature edge, wherein the first feature edge indicates the first feature node represents the first logical network feature having higher priority than the second logical network feature represented by the second feature node.

12. The computer system of claim 11, wherein the method further comprises defining the set of directed edges based on the feature priority graph.

13. The computer system of claim 8, wherein topologically sorting the logical network priority graph comprises;
traversing, by a topological sorting algorithm, the logical network priority graph by moving along the set of directed edges from source nodes to destination nodes;
storing, by the topological sorting algorithm, a marker of visited nodes in the logical network priority graph; and
determining, by the topological sorting algorithm, a potential ordering of all nodes in the logical network priority graph.

14. The computer system of claim 8, wherein the method further comprises;
determining the logical network priority graph comprises a cycle of nodes, wherein a cycle of nodes comprises one or more nodes and one or more directed edges such that at least one node can be reached by a chain of directed edges starting at the at least one node;
scheduling the one or more nodes to be updated simultaneously.

15. A non-transitory computer readable medium comprising instructions to be executed in a computer system, wherein the instructions when executed in the computer system perform a method for updating a logical network based on a logical network priority graph, the method comprising:
defining a plurality of nodes of the logical network priority graph, the plurality of nodes corresponding to a plurality of logical entities of the logical network;
defining a set of directed edges between the plurality of nodes, wherein a first edge of the set of directed edges is formed between a first node comprising a source node of the first edge and a second node comprising a destination node of the first edge, wherein the first edge indicates that a first logical entity corresponding to the first node is associated with a first logical network feature of higher priority than a second logical network feature associated with a second logical entity corresponding to the second node and that the second logical entity includes configuration information of the first logical entity;
determining an update to the logical network;
determining a set of logical entities of the plurality of logical entities to update based on the update to the logical network;
topologically sorting the logical network priority graph to produce an update ordering for the set of logical entities;
determining a set of host machines comprising a set of virtual entities corresponding to the set of logical entities; and
sending an update for each virtual entity of the set of virtual entities to a corresponding host machine of the set of host machines according to the update ordering.

16. The non-transitory computer readable medium of claim 15, wherein the set of virtual entities comprise software running on the set of host machines that implement functionality of the set of logical entities as defined by the logical network.

17. The non-transitory computer readable medium of claim 15, wherein the method further comprises;
defining a plurality of feature nodes of a feature priority graph, the plurality of feature nodes corresponding to a plurality of logical network features supported by the logical network, the plurality of logical network features comprising the first logical network feature and the second logical network feature;
defining a set of directed feature edges between the plurality of feature nodes, wherein a first feature edge of the set of directed feature edges is formed between a first feature node comprising a source node of the first feature edge and a second feature node comprising a destination node of the first feature edge, wherein the first feature edge indicates the first feature node represents the first logical network feature having higher priority than the second logical network feature represented by the second feature node.

18. The non-transitory computer readable medium of claim 17, wherein the method further comprises defining the set of directed edges based on the feature priority graph.

19. The non-transitory computer readable medium of claim 15, wherein topologically sorting the logical network priority graph comprises;
traversing, by a topological sorting algorithm, the logical network priority graph by moving along the set of directed edges from source nodes to destination nodes;
storing, by the topological sorting algorithm, a marker of visited nodes in the logical network priority graph; and determining, by the topological sorting algorithm, a potential ordering of all nodes in the logical network priority graph.

20. The non-transitory computer readable medium of claim 15, wherein the method further comprises;

determining the logical network priority graph comprises a cycle of nodes, wherein a cycle of nodes comprises one or more nodes and one or more directed edges such that at least one node can be reached by a chain of directed edges starting at the at least one node;

scheduling the one or more nodes to be updated simultaneously.

* * * * *